United States Patent

[11] 3,607,580

| | | | | |
|---|---|---|---|---|
| [72] | Inventor | Edward G. Obeda<br>Brookfield, Conn. | [50] | Field of Search.......................................... 156/580,<br>380, 73; 228/1 |
| [21] | Appl. No. | 801,658 | | |
| [22] | Filed | Feb. 24, 1969 | [56] | References Cited |
| [45] | Patented | Sept. 21, 1971 | | UNITED STATES PATENTS |
| [73] | Assignee | Branson Instruments, Incorporated<br>Stamford, Conn. | | |

| | | | |
|---|---|---|---|
| 3,365,349 | 1/1968 | Daniels et al. ................ | 156/580 |
| 3,376,179 | 4/1968 | Balamuth ..................... | 156/580 X |
| 3,483,066 | 12/1969 | Harris et al. .................. | 156/580 |

Primary Examiner—Benjamin A. Borchelt
Assistant Examiner—Jerald J. Devitt
Attorney—Ervin B. Steinberg

[54] TOOL HAVING PENETRATION LIMITING MEANS FOR JOINING THERMOPLASTIC PARTS BY SONIC OR ULTRASONIC ENERGY
8 Claims, 3 Drawing Figs.

[52] U.S. Cl........................................................ 156/580,
156/73, 228/1
[51] Int. Cl....................................................B32b 31/16,
B29c 27/08

ABSTRACT: A solid horn for sonic or ultrasonic energy transfer is provided with a sleeve assembly adapted to engage the workpiece to which the horn transfers energy. The sleeve assembly limits the penetration of the horn tip into the workpiece.

PATENTED SEP 21 1971

INVENTOR.
EDWARD G. OBEDA
BY
Ervin B. Steinberg

INVENTOR
EDWARD G. OBEDA
BY
Erwin B. Steinberg 3,607,580

TOOL HAVING PENETRATION LIMITING MEANS FOR JOINING THERMOPLASTIC PARTS BY SONIC OR ULTRASONIC ENERGY

This invention refers to a tool for joining thermoplastic parts and the like under the influence of sonic or ultrasonic energy. More specifically, this invention has reference to a sonic tool comprising a solid resonating horn which is fitted with an annular sleeve assembly for engaging a workpiece to which sonic or ultrasonic energy is transferred, and for limiting the motion of the solid horn relative to the workpiece. Quite specifically, this invention concerns a solid horn which is which is adapted to resonate at a sonic or ultrasonic frequency and having a tip shaped for penetrating into a workpiece, and including, moreover, a sleeve assembly surrounding the horn for limiting the amount of penetration of the tip into the workpiece.

The welding together of thermoplastic parts by means of ultrasonic energy is well known in the art and is shown, for instance, in U.S. Pat. No. 2,633,894 issued to P. B. Carwile, dated Apr. 7, 1953, entitled "Plastic Welding" and in U.S. Pat. No. 3,224,916 issued to R. S. Soloff et al., dated Dec. 21, 1965, entitled "Sonic Method of Welding Thermoplastic Parts."

A rather novel arrangement for welding together thermoplastic members of considerable thickness has been disclosed in copending application for U.S. Letters Patent of Stephen Fresh, Ser. No. 742,312 entitled "Method for Welding Thermoplastic Parts by Sonic Energy" filed on July 3, 1968. As disclosed in that application, two members to be joined are superposed on each other and a resonating horn, operating at a sonic or ultrasonic frequency, is applied to the surface of one of the members and urged into the one member, causing the frontal surface of the horn to penetrate through the surface of the exposed member until, responsive to the dissipation of sonic energy, softened thermoplastic material is developed at the interface between the two superposed members. The sonic or ultrasonic energy is then shut off, permitting the softened material to harden and provide a bond between the members. Subsequently, the horn is withdrawn from its penetrated position. While this method causes the presence of blind holes in at least one of the superposed members, both members remain firmly joined or fused together at their boundary line in proximity to the application of sonic energy.

The present invention deals with a tool comprising the combination of an acoustic solid horn and a sleeve assembly specifically designed to facilitate the described process, the sleeve assembly being arranged and located in such a manner as not to interfere with the acoustic energy transfer between the horn and workpiece, but merely to limit the penetration of the horn into the workpiece. This tool, therefore, enhances the quality and appearance of assembled thermoplastic parts and greatly facilitates the described process, especially when it is carried out by unskilled and semiskilled personnel as is necessary when performing work on a production line basis.

One of the principal objects of this invention, therefore, is the provision of a new and improved tool for sonic or ultrasonic energy operation.

Another important object of this invention is the provision of a new tool which includes a solid resonating horn and a sleeve assembly mounted to the horn and movable to a limited degree with respect to the horn.

A further important object of this invention is the provision of a resonating horn having a tip which is adapted to penetrate through the surface of a workpiece when transferring ultrasonic energy to such workpiece, and an assembly mounted to the horn for engaging the workpiece and limiting the amount of penetration of the horn into the workpiece.

Further and still other objects of this invention will be more clearly apparent by reference to the following description when taken in conjunction with the accompanying drawings, in which.

Figure 1:
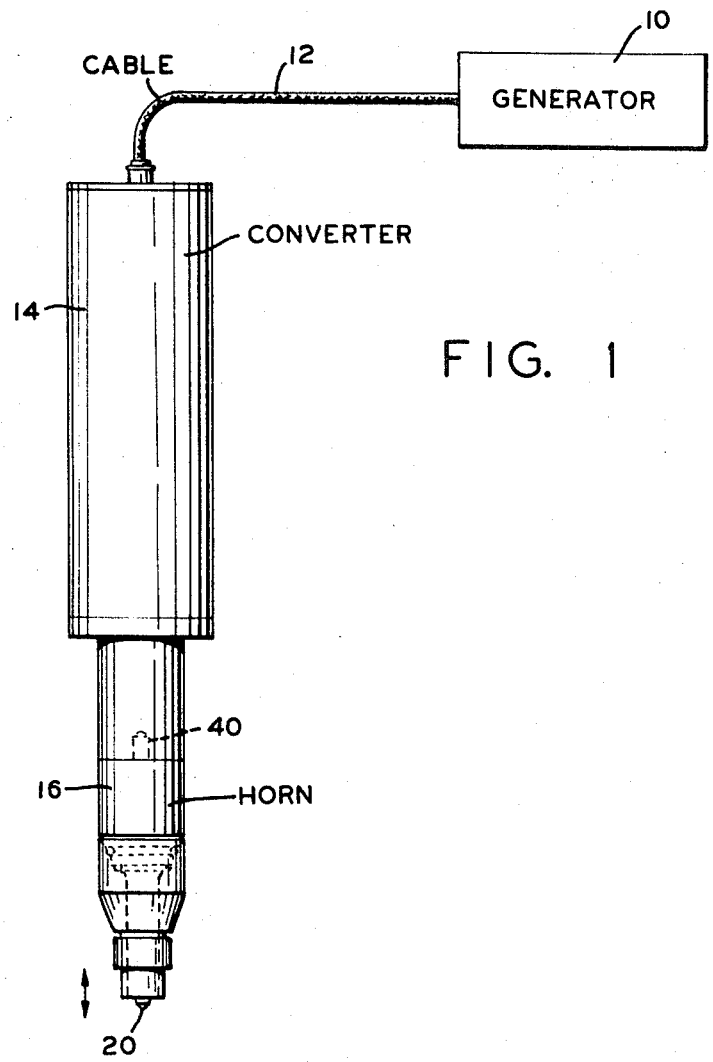
FIG. 1 is a schematic illustration of the components of the apparatus of which the tool forms a part.

Referring now to the figures and FIG. 1 in particular, numeral 10 identifies an electrical high-frequency generator which applies via a cable 12 electrical energy to a sonic energy converter 14 for producing sonic vibrations. The converter 14 is fitted with a mechanical amplitude transformer 16, also known as a solid horn, made of metallic material, such as aluminum or titanium. The generator 10, cable 12, and the converter 14 form a commercial unit which is available, for instance, as Model J—32 from the Branson Sonic Power Company, Danbury, Conn. The converter 14, in the model stated above, includes one or more piezoelectric disks (not shown) which convert the electrical energy supplied from the generator 10 to sonic energy. The amplitude of mechanical oscillations is amplified by the configuration of the horn 16 which is coupled by mechanical means to the piezoelectric disks as seen for instance in U.S. Pat. No. 3,328,610 issued to S. E. Jacke et al., entitled "Sonic Wave Generator," dated June 27, 1967.

Similar converter units, also commercially available, use magnetostrictive transducing means for converting the electrical energy received to sonic energy. Both types of converters generally operate at a frequency in the order of 18 to 25 kHz., but it will be understood by those skilled in the art that the precise frequency is not critical. In order to maintain the noise at a readily tolerable level, it is generally desirable that the sonic energy units operate in the ultrasonic frequency range, that is, at a frequency of 16 kHz. or higher. However, the units may be designed also to operate in the lower frequency range, for instance, 10 kHz. The length of the horn 16 is dimensioned to cause it to resonate along its axial direction as a half-wavelength resonator at the operating frequency, the frontal surface 20 of the horn being then located at an antinode and oscillating at maximum amplitude along the longitudinal axis of the horn as is indicated by the arrow.

Figure 2:
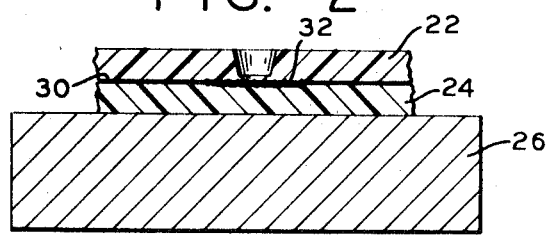
FIG. 2 is a sectional view of a typical workpiece joined by the process described hereinabove.

With reference to FIG. 2, there is shown a first thermoplastic member 22 which is superposed on a second thermoplastic member 24 whose underside rests on a stationary support 26. The thermoplastic members, typically structural pieces made of ABS plastic material, meet along an interface surface 30. When the horn 16 is caused to resonate responsive to the energization of the generator 10 and the tip 20 of the horn 16 is urged into the surface of the member 22 toward the interface surface 30, as has been explained in the patent application identified above, thermoplastic material is caused to soften and flow along the interface surface 30 as is shown by the numeral 32. Upon the cessation of sonic energy, this softened material hardens and fuses with the surrounding material to provide a bond between both members 22 and 24.

Figure 3:
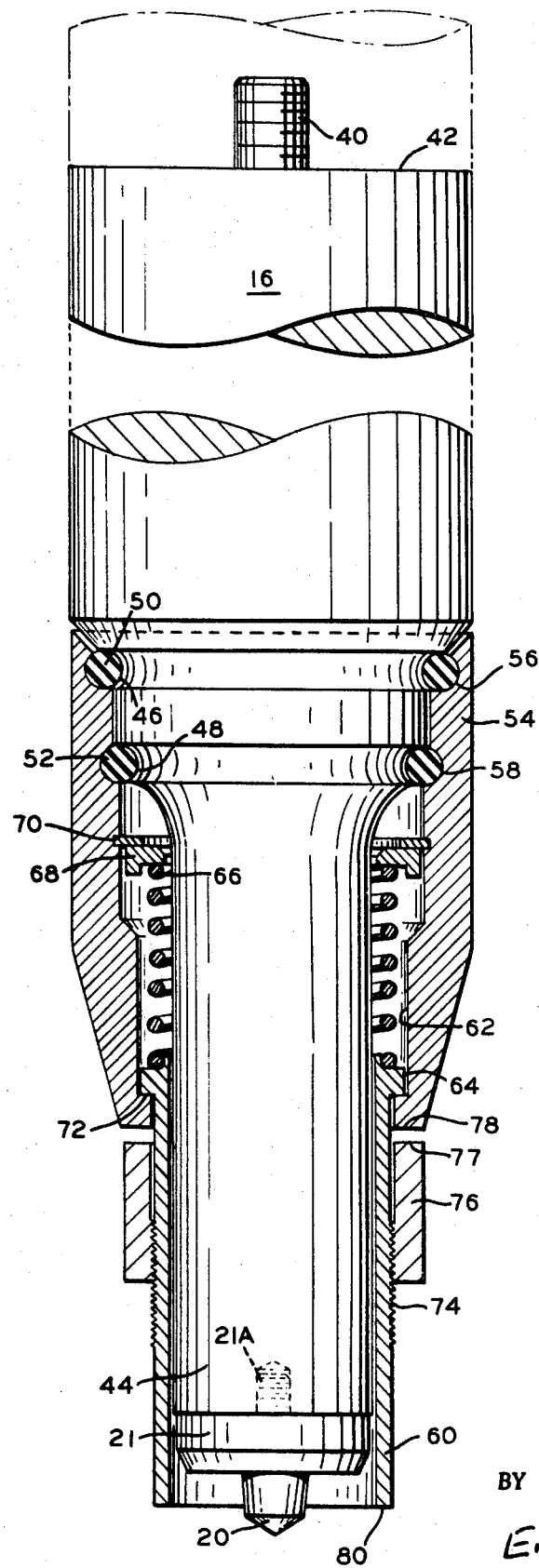
FIG. 3 is a vertical view, partly in section, of the tool comprising the solid horn and the sleeve assembly mounted in operative relationship therewith and forming the present invention.

The tool comprising the resonating horn and a surrounding sleeve assembly is shown in detail with reference to FIG. 3. The horn 16 is provided with a threaded stud 40 for coupling to the converter 14. The radial surface 42 constitutes essentially the input surface of the horn 16 at which the vibrations in the sonic or ultrasonic frequency range are received from the converter 14. This surface is located at an antinodal region of the horn. The horn is provided, moreover, with an output section 44 of reduced diameter in order to increase the vibrational amplitude obtained at the frontal surface 20 which is adapted to engage a workpiece for transferring sonic energy thereto. Since the horn resonates as a half wavelength resonator, the output surface is located also substantially at an antinode region.

Centrally disposed with regard to both antinodal regions is a nodal region at which the amplitude of longitudinal motion is substantially zero. With this region is disposed a set of axially spaced, annular grooves 46 and 48 which are fitted with respective O-ring gaskets 50 and 52 for providing vibration isolation to a first and stationary annular sleeve 54. The O- rings 50 and 52 rest in corresponding annular grooves 56 and 58 of the sleeve 54. The sleeve 54 is fitted with a second annular sleeve 60 adapted to move in telescopic fashion in axial direction relative to the first sleeve 54. This telescoping arrangement is achieved by virtue of the engaging sliding surfaces 62 and 64. The second and lower sleeve 60 is urged downward and into extended position relative to the first sleeve by means of a helical coil spring 66 whose upper end is supported by an annular washer 68 and a stationary snap ring 70 disposed in an internal groove of the upper sleeve 54.

The lower end of the spring 66 presses against the upper end of the sleeve 60, urging the sleeve 60 into its extended position, such motion being limited by the complementary radial surfaces 72 of sleeve 54 and sleeve 60. The sleeve 60 is machined with an external thread 74 over which an internally threaded ring 76 is threaded. The motion of the sleeve 60 against the force exerted by the coil spring 66 is limited by the setting of the ring 76, that is, the sleeve 60 can retract into the stationary sleeve 54 only until the upper radial surface 77 of the ring abuts against the lower surface 78 of the sleeve 54. Thus, by lowering the ring 76 toward the tip of the horn, the sleeve 60 can retract further into the sleeve 54.

The frontal surface 20 of the horn 16 is part of a replaceable or exchangeable tool tip 21 which is threaded into the front portion 44 of the horn 16 by means of a stud 21A as indicated.

It will be apparent that the sleeve assembly, comprising essentially sleeves 54 and 60, is decoupled from the resonating horn by virtue of the resilient mounting located at the nodal region of the horn. Thus, the sleeve assembly receives substantially no sonic energy, yet permits the horn to resonate in accordance with the received energy.

Operation of this tool may be visualized from the following description:

Referring also to FIG. 2, the converter 14 is energized by activating the generator 10, causing the horn 16 to resonate at its designed frequency. The tip of the horn 20 is then brought into contact with the exposed surface of the workpiece 22 and, responsive to the dissipation of sonic energy, thermoplastic material softens and the horn is urged to penetrate through the surface of the workpiece 22 into the material toward the interface surface 30. As the pointed tip 20 penetrates into the workpiece, the radial and distal surface 80 of the sleeve 60 comes to rest on the exposed surface of the workpiece 22 and, as the horn penetrates deeper into the workpiece, the sleeve 60 retracts into the stationary sleeve 54 against the pressure of the spring 66. When the upper ring surface 77 abuts against the lower surface 78 of the sleeve 54, a stop is reached and the horn is prevented from further penetration into the workpiece. The energy is now shut off and, after a dwell time during which the thermoplastic material is permitted to harden, the horn tip is withdrawn from the workpiece.

Thus, it will be apparent that by means of the acoustically decoupled sleeve assembly surrounding the horn, the penetration of the sonically vibrating horn into the workpiece can be accurately set and controlled to provide for uniformity and ease of operation.

Still further, while the distal surface 80 is shown as being disposed somewhat rearward of the frontal surface 20 of the horn, causing the horn 20 to engage the workpiece before the sleeve 60 is in contact with the workpiece, it will be apparent to those skilled in the art that the surface 80 may be made to extend beyond the frontal surface of the horn in which case the sleeve assembly contacts the workpiece surface and provides pressure against an underlying workpiece prior to the existence of contact between the resonating horn and the workpiece. In both instances, however, the sleeve assembly surrounding the horn is adapted and useful for limiting the motion of the horn relative to the workpiece, specifically the penetration of the horn into the workpiece.

Additionally, it will be possible to introduce airflow into the gap between the sleeve 60 and the horn portion 44 in order to provide cooling of the horn and accelerate hardening of the softened thermoplastic material.

What is claimed is:

1. A solid horn adapted to resonate when receiving sonic energy at an input surface and transfer such energy to a workpiece at an opposite output surface, said output surface being shaped for penetration into the workpiece; means mounted to said horn for also engaging the workpiece and for limiting the distance of penetration of said output surface into the workpiece, and means disposed between said horn and said means mounted to said horn for acoustically decoupling said means for engaging the workpiece from the vibrations of said horn.

2. A sonic tool comprising:

a solid horn adapted to oscillate at a sonic frequency when receiving sonic energy at an input surface and having an opposite output surface disposed substantially at an antinodal region of said horn and adapted to be in contact with a workpiece for transferring sonic energy thereto, a first annular sleeve mounted to said horn and substantially vibration isolated therefrom;

a second annular sleeve movable axially relative to said first sleeve and surrounding at least a portion of said horn in proximity to said output surface of said horn, and said second sleeve having a workpiece engaging surface adapted to engage an exposed surface of the workpiece to which the output surface of said horn is adapted to transfer such energy;

resilient means disposed between said first and second sleeves for urging said second sleeve in axial direction of said horn toward engagement with such workpiece, and responsive to the penetration of the output surface of said horn into the workpiece said second sleeve being urged in said axial direction relative to said first sleeve against the force exerted by said resilient means, and means for limiting the axial motion of said second sleeve relative to said first sleeve, whereby to limit the penetration of said output surface into the workpiece.

3. A sonic tool comprising:

a solid horn adapted to resonate when receiving sonic energy at an input surface and transfer such energy to a workpiece by means of an opposite output surface, said output surface being shaped to penetrate into the workpiece;

a pair of telescoping sleeves disposed about said horn;

means for mounting a first one of said sleeves with one of its ends at a nodal region of said horn;

resilient means disposed between said sleeves for urging the second one of said sleeves in extended position for causing the distal end of said second sleeve to be disposed for engaging the workpiece during the process said output surface is in energy transferring relationship with the workpiece and urged into the workpiece, and means for adjustably limiting the amount of retraction of said second sleeve in response to the said second sleeve being urged against the force exerted by said resilient means, whereby to limit the penetration of said output surface in the workpiece when said output surface is in forced contact with the workpiece.

4. A sonic tool as set forth in claim 3, said means for limiting including adjustable means coacting between said first and second sleeves for setting the distance said second sleeve is adapted to retract into said first sleeve against the force exerted by said resilient means.

5. A sonic tool as set forth in claim 3, said means for mounting including resilient means.

6. A sonic tool as set forth in claim 3, said resilient means including a helical coil spring.

7. A sonic tool as set forth in claim 3, the output surface of said horn being pointed to facilitate penetration thereof into the workpiece.

8. A tool comprising:

a solid horn adapted to oscillate at an ultrasonic frequency along its longitudinal axis when receiving ultrasonic energy at a radial input surface and having an opposite output surface disposed substantially at an antinodal region of said horn, said output surface being adapted to be in contact with a workpiece for transferring ultrasonic vibrations thereto;

a first sleevelike member mounted to said horn in substantially fixed position along the longitudinal axis of said horn and in substantially vibration isolated relation;

a second sleevelike member disposed slidably movable in axial direction about said first sleevelike member and surrounding at least a portion of said horn in proximity to said output surface of said horn, and said second member having a radially disposed workpiece engaging surface adapted to engage the exposed surface of the workpiece to which the output surface of said horn is adapted to transfer such vibrations, and means for limiting the axial motion of said second member relative to said first member, whereby to limit, when said horn is urged into said workpiece and said workpiece engaging surface engages the exposed surface of the workpiece, the penetration of said output surface into the workpiece.